(12) United States Patent
Seel (10) Patent No.: US 9,987,991 B2
(45) Date of Patent: Jun. 5, 2018

(54) CARGO SPACE COVER

(71) Applicant: Macauto Industrial Co., Ltd., Tainan (TW)

(72) Inventor: Holger Seel, Wuppertal (DE)

(73) Assignee: Macauto Industrial Co., Ltd., Yongkang District, Tainan (TW)

( * ) Notice: Subject to any disclaimer, the term of this patent is extended or adjusted under 35 U.S.C. 154(b) by 0 days. days.

(21) Appl. No.: 15/341,950

(22) Filed: Nov. 2, 2016

(65) Prior Publication Data

US 2017/0120831 A1 May 4, 2017

(30) Foreign Application Priority Data

Nov. 3, 2015 (DE) .......................... 10 2015 118 775

(51) Int. Cl.
*B60R 5/04* (2006.01)
*B60R 13/01* (2006.01)

(52) U.S. Cl.
CPC ............ *B60R 5/047* (2013.01); *B60R 13/013* (2013.01)

(58) Field of Classification Search
CPC ..................................................... B60R 5/047
USPC ............................. 296/37.16; 160/265, 266
See application file for complete search history.

(56) References Cited

U.S. PATENT DOCUMENTS

| 6,416,103 B1 * | 7/2002 | Laudenbach ........... B60R 5/047 160/290.1 |
| 7,963,580 B2 * | 6/2011 | Plettrichs ................ B60R 5/047 296/37.16 |
| 2008/0216973 A1 * | 9/2008 | Walter ................... B60J 1/2027 160/313 |

FOREIGN PATENT DOCUMENTS

| DE | 19834777 A1 | 2/2000 |
| DE | 19944948 C1 | 5/2001 |
| EP | 0941176 A1 | 9/1999 |
| WO | WO9824657 | 6/1998 |

* cited by examiner

*Primary Examiner* — Dennis H Pedder
(74) *Attorney, Agent, or Firm* — Von Rohrscheidt Patents (57) ABSTRACT

A cargo space cover for vehicles including a roller blind which is fixated with a first edge at a winding shaft and which includes a tension rod at a second edge that is remote from the winding shaft; a winding shaft drive which acts against a pull out movement of the roller blind and which moves the roller blind from a pulled out position into a pulled in position; and a support device which cooperates with the tension rod and by which the roller blind is movable into an intermediary position that releases a vehicle cargo space at least partially, wherein a positioning drive is provided in addition to the winding shaft drive, wherein the positioning drive moves the tension rod which moves the roller blind into at least one intermediary position.

3 Claims, 15 Drawing Sheets

CARGO SPACE COVER

RELATED APP APPLICATIONS

This application claims priority from and incorporates by reference German Patent Application 10 2015 118 775.2 filed on Nov. 3, 2015.

FIELD OF THE INVENTION

The invention relates to a cargo space cover for vehicles.

BACKGROUND OF THE INVENTION

A generic cargo space cover is known from EP 0 941 176 A1. The cargo space cover is used in station wagons to cover the cargo space below a window edge and conceal it from view. In order to provide access to the cargo space without respectively winding the cargo space cover onto the winding shaft completely the recited document provides a guide which moves the cargo space cover into an intermediary position that is arranged between the cover position and the pulled in position. In the instant embodiment the cargo space cover is run back slightly and in particular in an upward direction. This way the cargo space cover releases an opening which has a size that is similar to the body opening formed by the hatch of the station wagon.

Pulling back the cargo space cover into the intermediary position is performed in the instant embodiment by a motor drive which operates the winding shaft of the cargo cover and tightens the cargo space cover by winding it up.

It is furthermore known in the art to return the cargo space cover that is in the intermediary position by an additional, typically electric drive into a covering position during or after closing the hatch.

These known solutions have worked reasonably well in practical applications. However, it has been a disadvantage that the intermediary position of the cargo space cover is exactly defined by the guide and not adaptable to user requirements.

BRIEF SUMMARY OF THE INVENTION

Thus, it is an object of the invention to provide a cargo space cover of the general type described supra where the intermediary position of the cargo space cover can be selected according to requirements of the user.

The object is achieved by a cargo space cover for vehicles including a roller blind which is fixated with a first edge at a winding shaft and which includes a tension rod at a second edge that is remote from the winding shaft; a winding shaft drive which acts against a pull out movement of the roller blind and which moves the roller blind from a pulled out position into a pulled in position; and a support device which cooperates with the tension rod and by which the roller blind is movable into an intermediary position that releases a vehicle cargo space at least partially, wherein a positioning drive is provided in addition to the winding shaft drive, wherein the positioning drive moves the tension rod which moves the roller blind into at least one intermediary position.

Using a separate positioning drive, which shall be configured in particular as an electric motor drive facilitates influencing the desired intermediary position with a motor control. Thus, many situations can be considered. A personal convenience opening width can for example be defined by influencing the motor control. A taller person can for example select an intermediary position where the roller blind releases a larger cargo space opening than for a shorter person. It is furthermore conceivable to adapt the intermediary position to particular frequently occurring loading situations. It is furthermore possible to define plural intermediary positions increasing convenience. Thus, it is possible for example that opening the hatch of the vehicle causes an opening movement in pull in direction of the roller blind into a first intermediary position which releases the cargo space opening as far as possible. As a function of a particular loading situation, however the roller blind is not moved back into its cover position but into a second intermediary position that covers the cargo. This is useful in particular when the cargo does not allow a movement of the roller blind into the cover position. It is also possible to detect such loading situations in an automated manner so that no user interference is necessary.

Overall the invention facilitates to adapt the intermediary position of the roller blind in a particularly simple manner to user requirements or loading situations using a separate electrical positioning drive.

An advantageous embodiment is characterized in that the support device is at least one support profile that is directly or indirectly arranged at the vehicle body wherein the tension rod engages the support profile at least with one end of the tension rod. Thus, it is provided in particular that the support profile forms a portion of the inner vehicle body fairing and includes in particular a support groove that is engaged by the end of the tension rod.

It is furthermore provided that an operating element is arranged in a portion of the support profile wherein the operating element supports the tension rod against the winding shaft drive and wherein the positioning drive moves the roller blind into an intermediary position using the operating element. Thus, the operating element can be in particular a motor driven slide that engages the support groove and is guided in the support groove.

The invention provides in an embodiment that the support profile includes a first seat for the tension rod in which the tension rod is supported relative to the winding shaft drive in the cover position. In this seat the tension rod is retained in the cover position also without interference of the electric motor drive. It is furthermore provided that the support profile includes a second seat for the tension rod in which the tension rod is supported relative to the winding shaft drive in an intermediary position. Also here the tension rod is retained in the intermediary position solely by the seat without any interference from the electric motor drive being required. It is certainly conceivable to provide additional seats for additional intermediary positions.

It is particularly advantageous when the support profile includes at least one inlet through which at least one end of the tension rod is insertable into the support profile and/or retrievable from the support profile, in particular when the inlet is arranged proximal to the first seat and/or when the inlet is arranged proximal to the second seat.

The inlet proximal to the first seat facilitates inserting the roller blind into the support profile in the cover position of the roller blind or to extract the roller blind in this position from the support profile in order to wind the roller blind onto the winding shaft. In the same manner the inlet is advantageously useable proximal to the second seat. Additionally extracting the tension rod from the support profile is also possible when the loading situation does not allow returning the tension rod into the pull out position of the roller blind.

Eventually it is provided that the inlet is arranged in a pull in direction of the roller blind in front of the first seat or in front of the second seat. This arrangement of the inlet in the pull in direction of the roller blind in front of the respective seat facilitates that the winding shaft drive provides for a supporting movement of the tension rod in a direction of the respective seat when the electric motor drive has no impact.

Another embodiment provides that the operating element is movable within the support profile against a spring element in a direction of an intermediary position. It is an essential advantage of this embodiment that the tension rod can move the operating element against a spring force so that the operating element is in particular moved into an inlet. Upon a corresponding positioning of the inlet relative to the cover position of the tension rod the tension rod can be retrieved from the support profile even when the power supply of the electric motor operated positioning drive is cut off and the roller blind can be rolled onto the winding shaft until the tension rod is in its pulled in position.

It is furthermore provided that the support profile has a stop in the portion of the inlet. Through the stop a tactile marking of the inlet can be provided in particular for manual operations which is advantageous in particular because the roller blind typically conceals a portion from view in which portion the inlet is arranged when extracting the tension rod from the support profile.

It is furthermore provided that the stop moves the tension rod into the inlet for a manual movement along the support profile.

BRIEF DESCRIPTION OF THE DRAWINGS

Additional advantages of the invention and improved comprehension can be derived from the subsequent description of advantageous embodiments with reference to drawing figures, wherein.

DETAILED DESCRIPTION OF THE INVENTION

Using only schematic figures exclusively showing the essential portion of a cargo space cover the invention is now described based on two embodiments.

Figure 1:
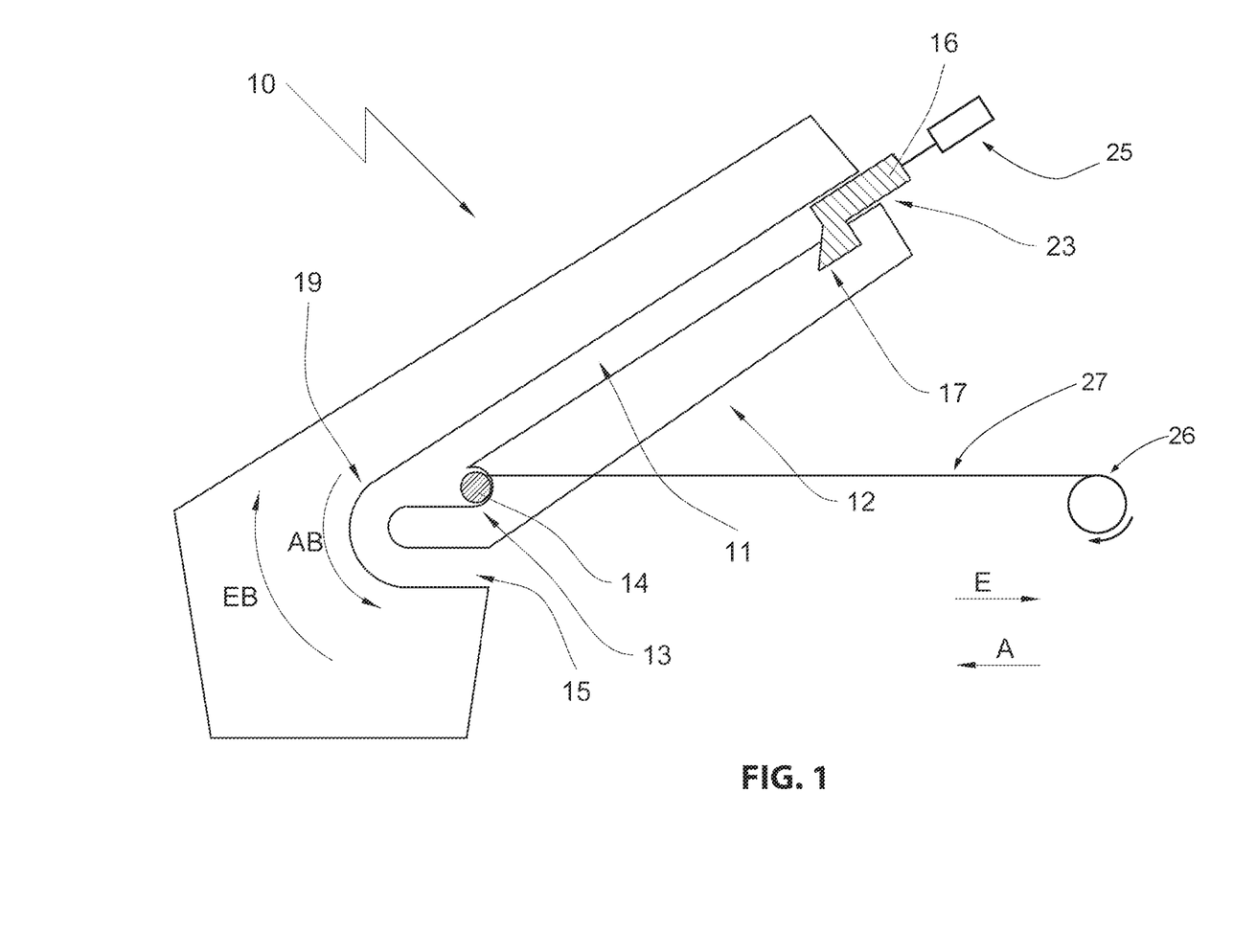
FIG. 1 illustrates a first embodiment of the invention with the tension rod in the pulled out position.

FIG. 1 illustrates a support device 10 configured as profile groove 11 which is configured by a side fairing element 12 of a motor vehicle. In this profile groove a first seat 13 is configured between a lower profile groove end 19 and an upper profile groove end 23 wherein a tension rod 14 of a cargo space cover is inserted into the first seat 13 in the pulled out position of the cargo space cover. Arranged in pull in direction E of the roller blind 27 in front of the first seat 13 and thus transitioning into the lower profile grove end 19, the profile groove 11 includes an inlet 15 through which the tension rod 14 can be extracted from the profile groove or is insertable into the profile groove corresponding to the arrows EB indicating the insertion direction or the arrows AB defining the extraction direction. Eventually a slide 16 is supported in the profile groove 11 and movable by a positioning drive 25 wherein the slide is provided with a lifting lug 17. The slide is arranged in FIG. 1 in its starting position at the upper profile groove end 23 from which it is movable in a direction towards the first seat 13 and back again from there.

Figure 2:
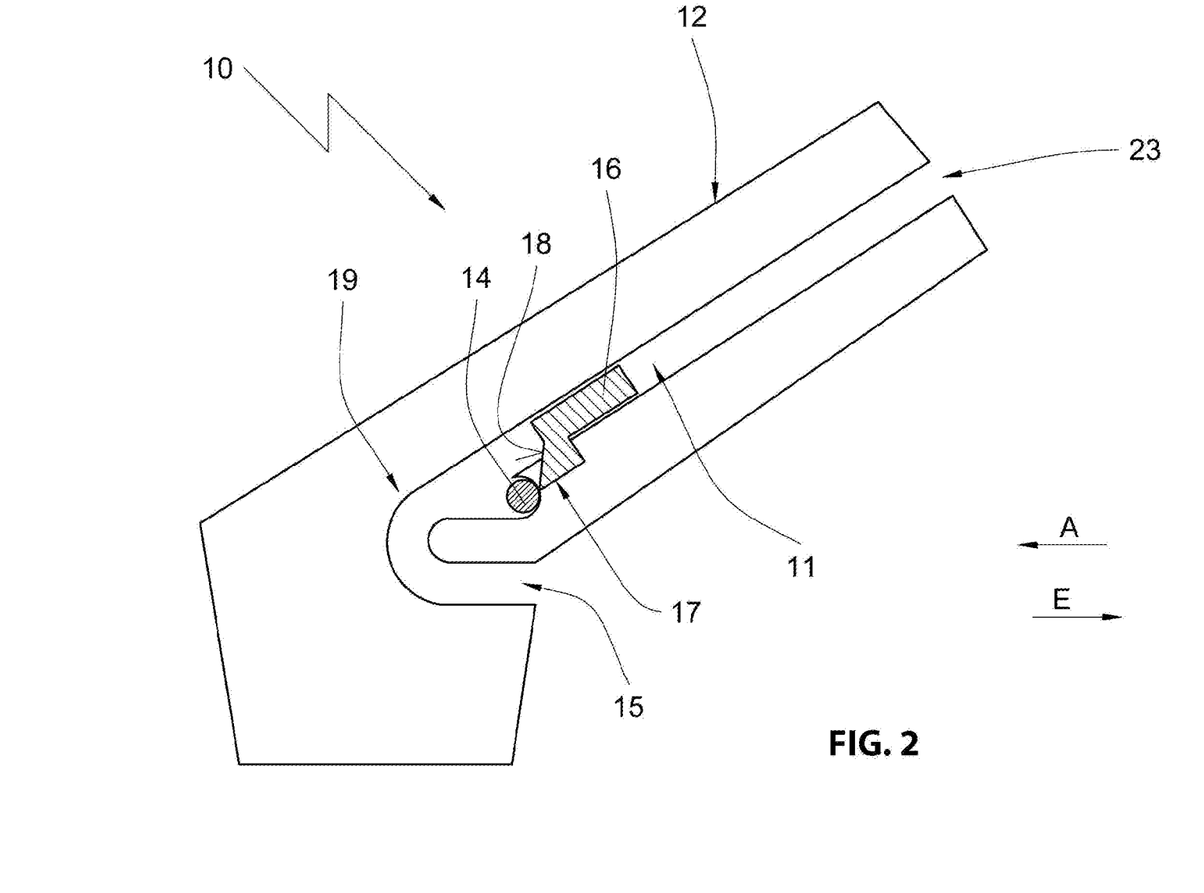
FIG. 2 illustrates the depiction according to FIG. 1 with an operating element applied to the tension rod.
Figure 3:
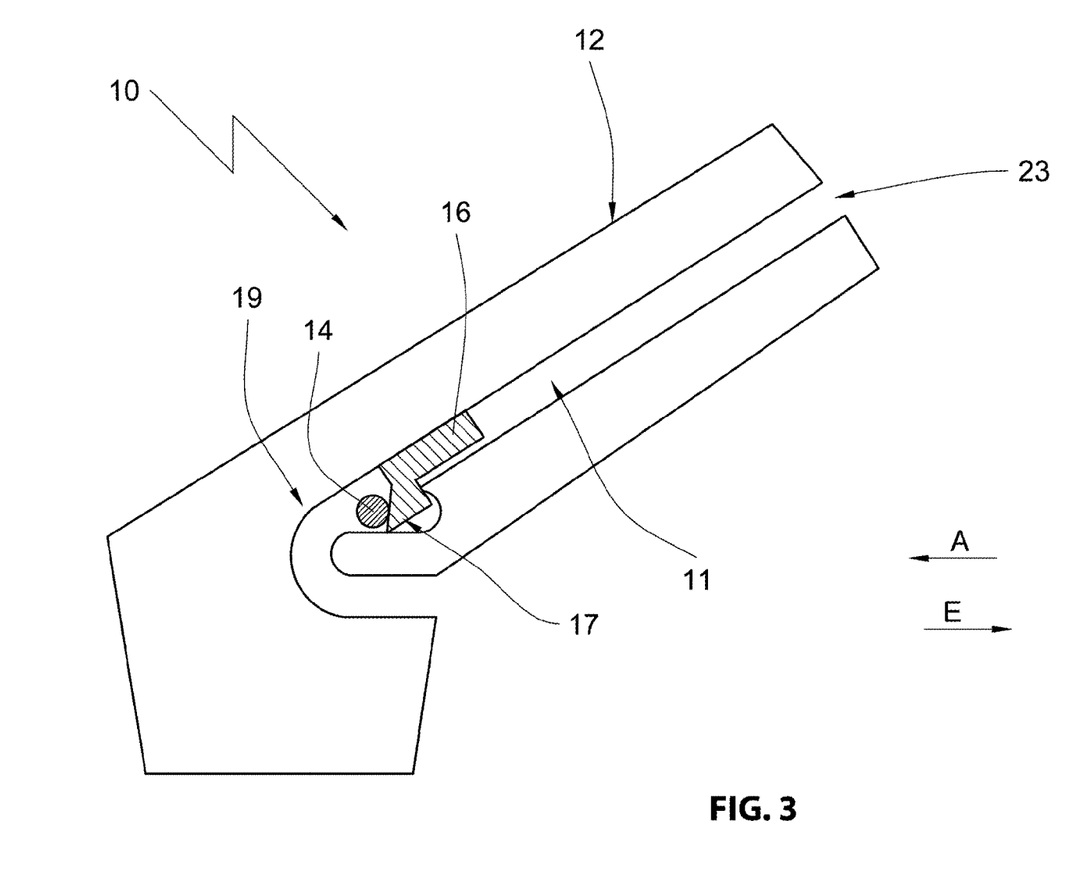
FIG. 3 illustrates the depiction according to FIG. 1 with the tension rod raised by the operating element.

In FIG. 2 the slide 16 was moved far enough in a direction towards the tension rod 14 within the profile groove 11 until the lifting lug 17 contacts the tension rod 14. Using the lifting lug 17 the tension rod is now pushed in pull out direction A of the roller blind from the first seat 13 and received by the slide 16. Thus, as evident from the comparing view of FIGS. 2, 3 and 4 a lifting surface 18 slides under the tension rod 14 and thus moves the tension rod 14 into a tension rod receiver of the slide 16. As soon as the tension rod 14 is inserted into the tension rod receiver of the slide 16 the position of the tension rod within the profile groove 11 is only determined by the position of the slide.

Figure 4:
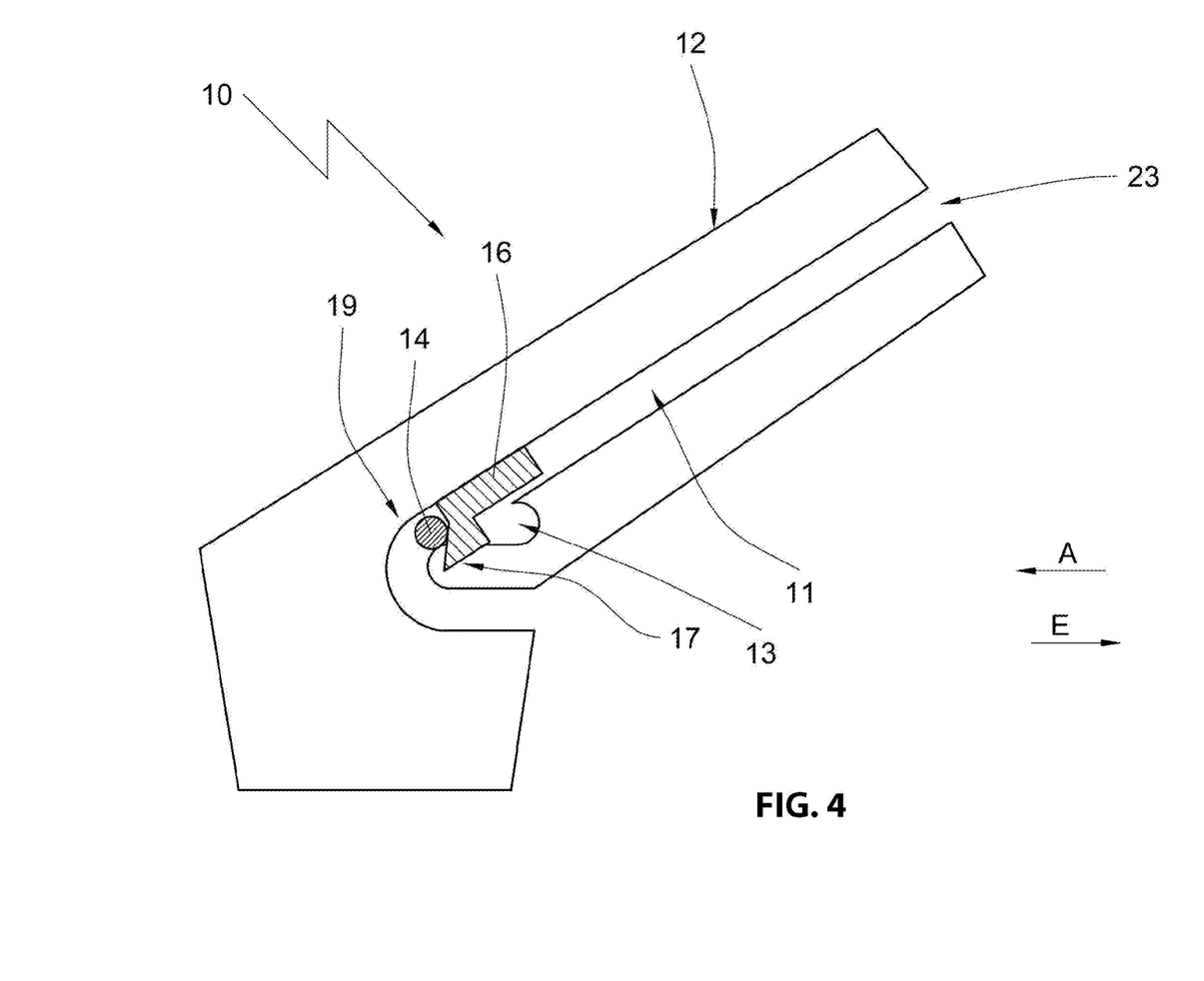
FIG. 4 illustrates the depiction according to FIG. 1 with the tension rod inserted into the operating element.

Using the motor driven slide 16 the tension rod 14 is freely movable within the profile groove 11. Thus, the position of the slide 16 arranged proximal to the first seat 13 at a lower profile groove end 19 defines the so called pull out or cover position of the roller blind in which the roller blind protects the cargo space of the station wagon from view when the hatch is closed.

Figure 5:
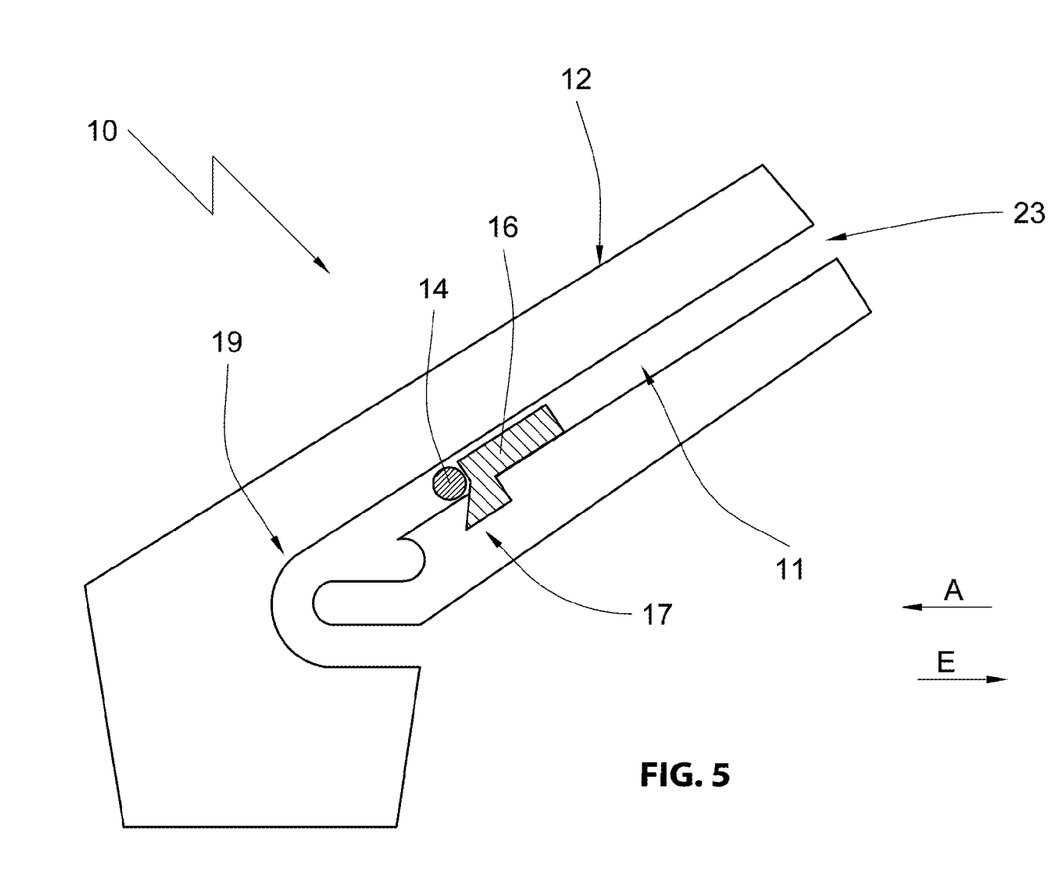
FIG. 5 illustrates the depiction according to FIG. 1 with the tension rod in a first intermediary position.
Figure 6:
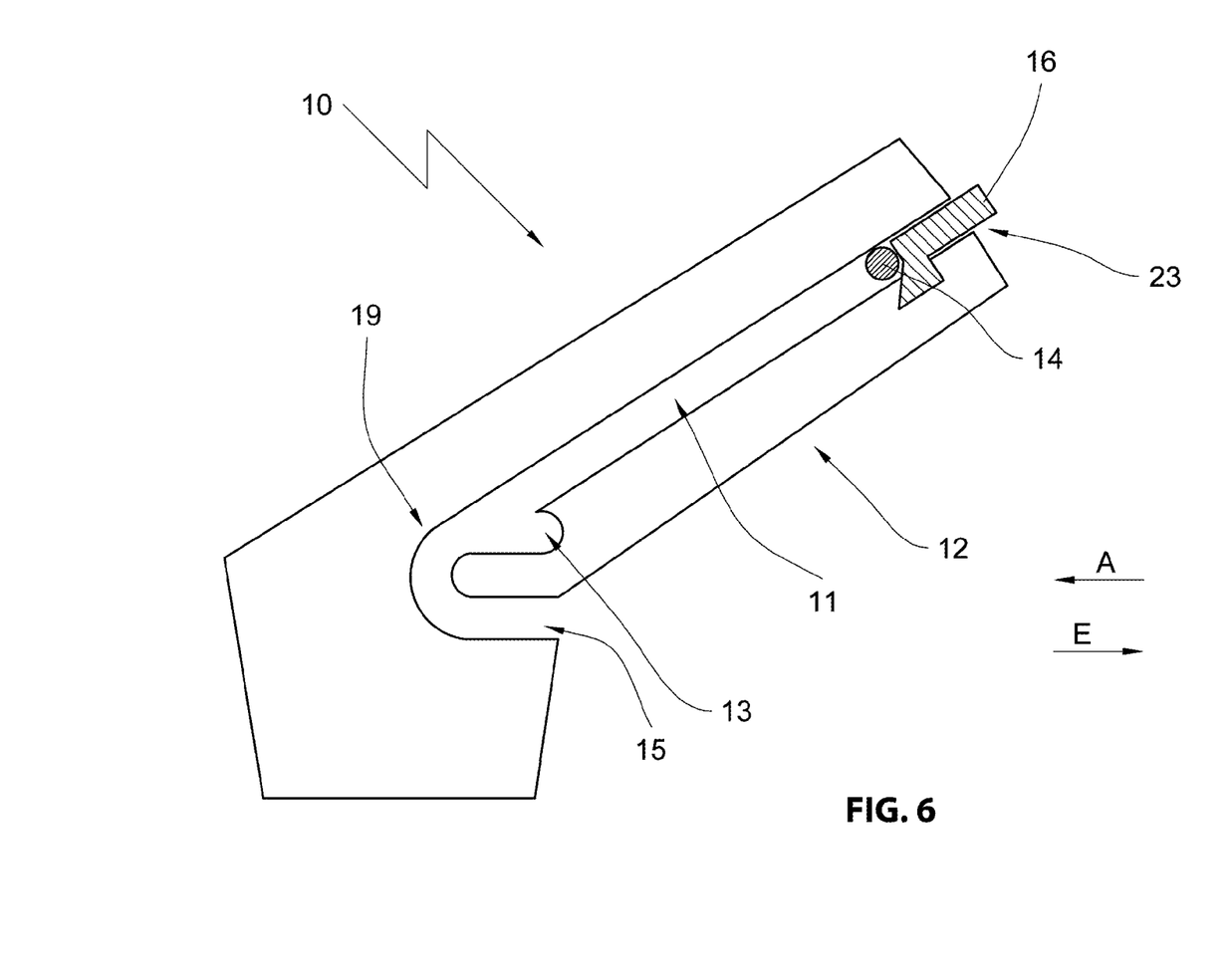
FIG. 6 illustrates the depiction according to FIG. 1 with the tension rod in a second intermediary position.
Figure 7:
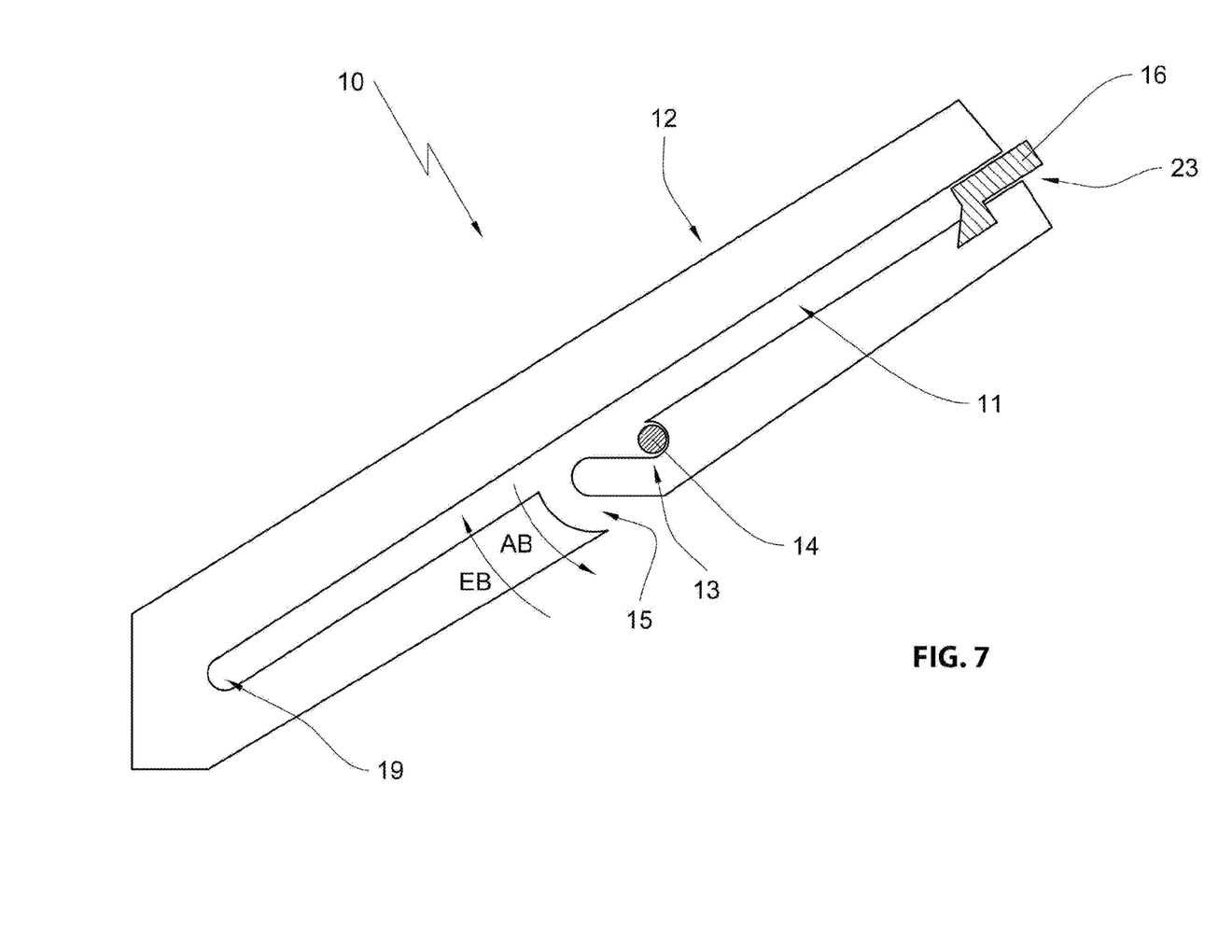
FIG. 7 illustrates a second embodiment of the invention with the tension rod inserted into the support profile.

Based on FIGS. 5 and 6 it is now illustrated how the slide 16 is moved back within the profile groove 11 in a direction of its starting position at the upper profile groove end 23 so that the tension rod 14 is moved into an intermediary position at least partially releasing the cargo space access. This process of moving the slide 16 in a direction of its starting position illustrated in FIG. 1 can be coupled with the opening process of the trunk hatch of the station wagon, however it is also conceivable that this movement of the slide 16 is decoupled from the opening process.

As evident from the FIGs. the tension rod can always be moved by hand back into the seat 13. It is also possible anytime to move the tension rod 14 out of the inlet 15 by hand in order to move the roller blind completely in pull in direction E and in order to completely release the cargo space.

FIGS. 7-12 illustrate a second embodiment of the invention. This embodiment is similar to the embodiment illustrated in FIGS. 1-6 in many respects, in particular with respect to structure and function. Also here the figures illustrate the support device 10 which is formed by a side fairing element 12 with a profile groove 11. This profile groove 11 forms a first seat 13 in which the tension rod 14 is inserted in FIG. 7. A slide 16 illustrated in FIG. 7 in a starting position at an upper profile groove end 23 also includes the described lifting lug 17 with the lifting surface 18. Differently from the first embodiment the first seat 13 defines a first intermediary position, the starting position of the slide 16 defines a second intermediary position of the tension rod 14 and thus of the roller blind. Also here the inlet 15 is not arranged in the portion of the pull out or cover position at a lower profile grove end 19 of the tension rod 14 but in the portion of the seat 13 forming a first intermediary position.

Figure 8:
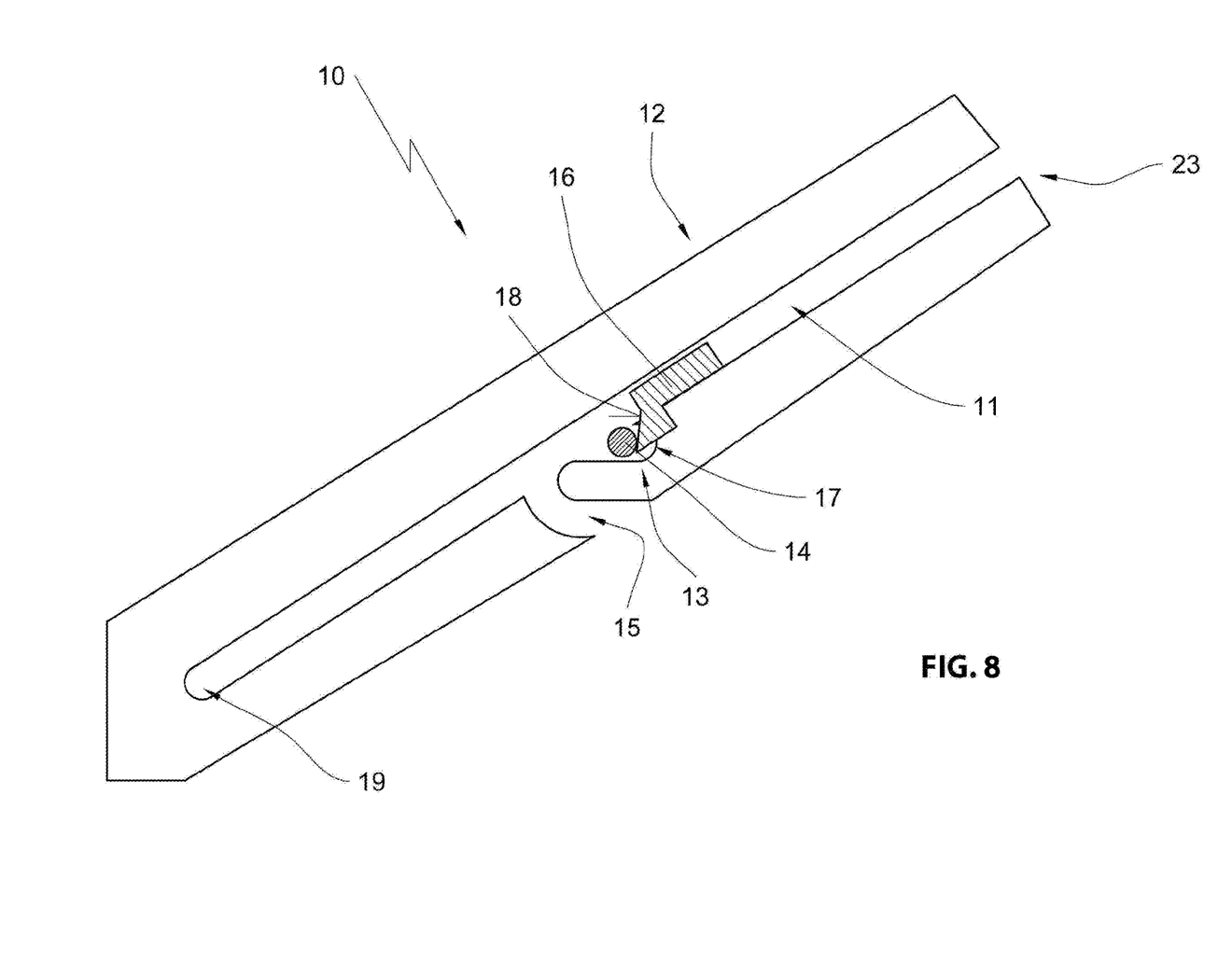
FIG. 8 illustrates the depiction according to FIG. 7 wherein the operating element lifts up the tension rod.
Figure 9:
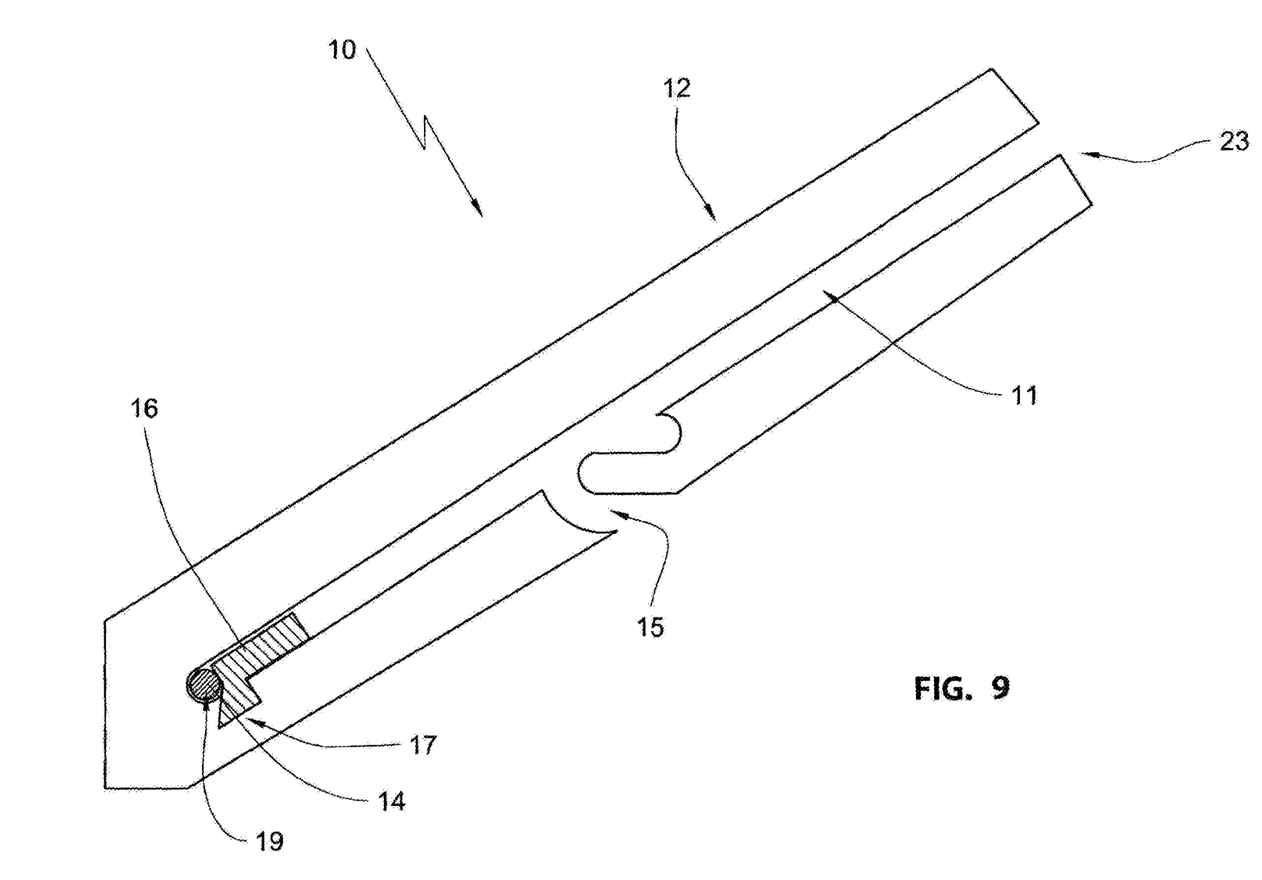
FIG. 9 illustrates the depiction according to FIG. 7 with the tension rod in pulled out position.

It is now illustrated in FIG. 8 that the slide was moved from its starting position in a direction towards the first seat 13 and reaches with its lifting lug 17 and the lifting surface 18 under the tension rod 14. The tension rod 14 is now disengaged from the first seat 13 in the pull out direction A of the roller blind as already described with reference to the first embodiment so that the tension rod is supported in the tension rod receiver of the slide 16. The slide 16 now moves further forward at the lower profile groove end 19 towards the pull out or cover position of the roller blind until the slide 16 has reached its pull out or cover position as illustrated in FIG. 9.

Figure 10:
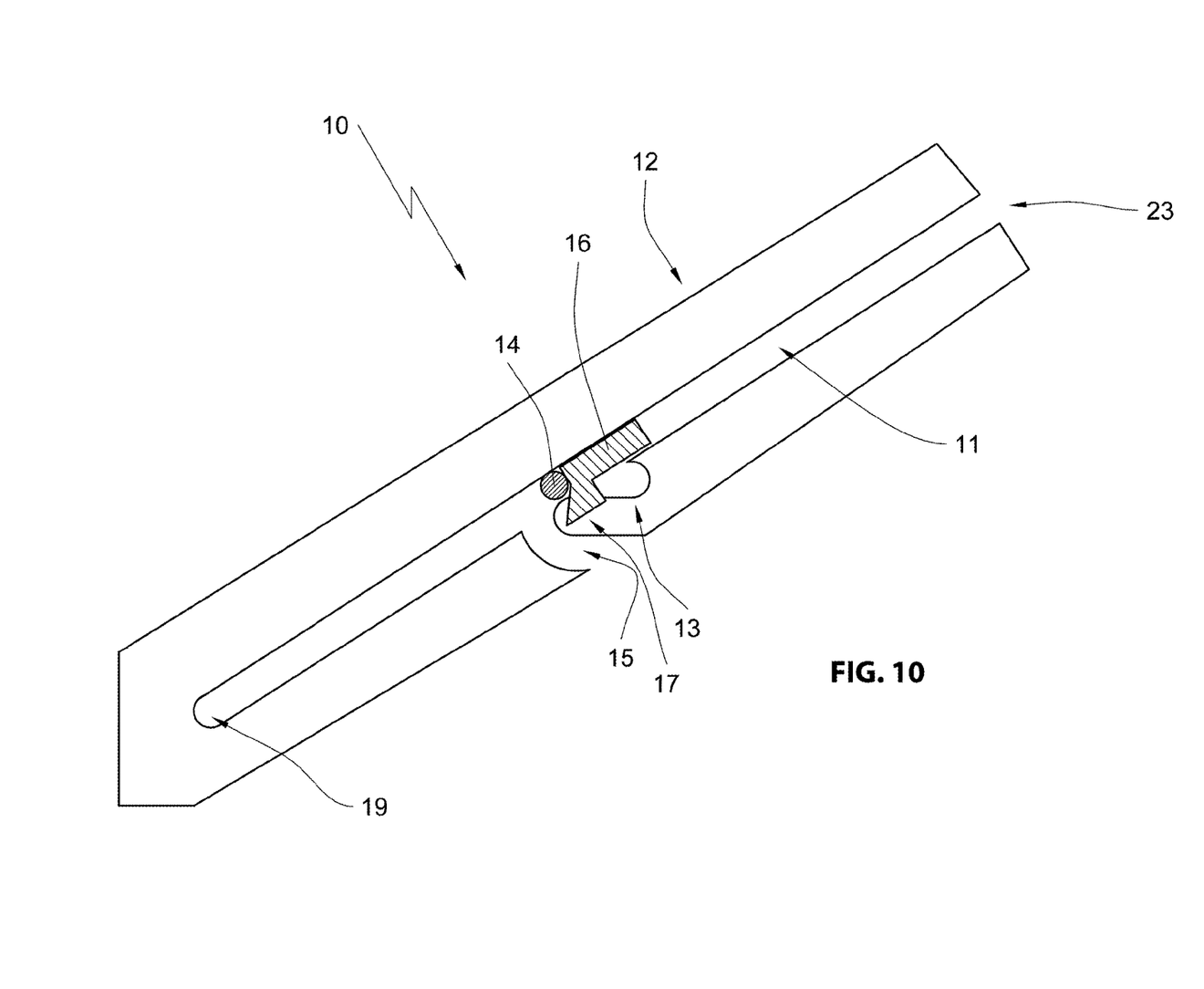
FIG. 10 illustrates the depiction according to FIG. 7 with the tension rod in a first intermediary position.
Figure 11:
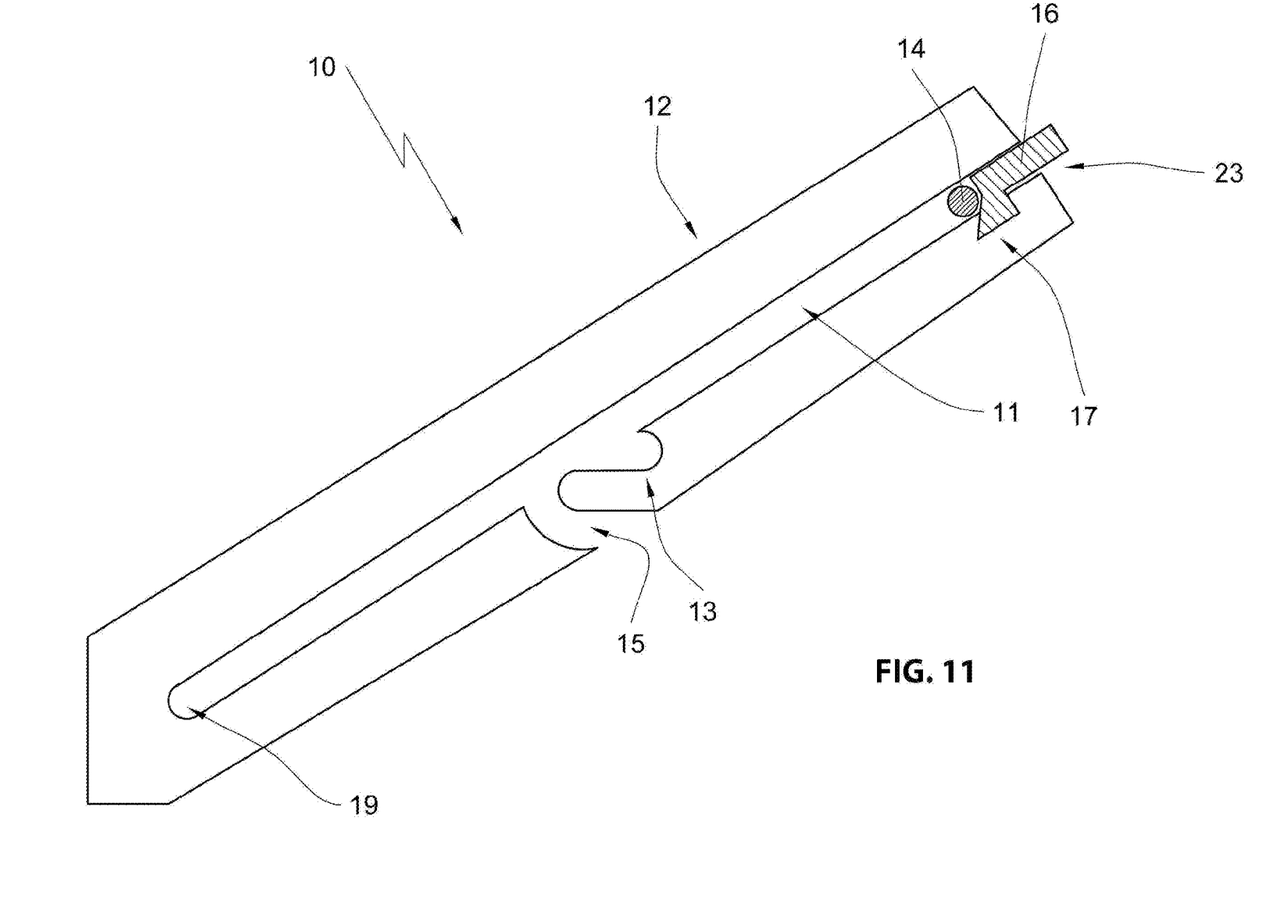
FIG. 11 illustrates the depiction according to FIG. 7 with the tension in a second intermediary position.

Like in the first embodiment the tension rod 14 is only moveable in a direction towards its starting position into an intermediary position at least partially releasing the cargo space by moving the slide 16 backward. This backward movement which can in induced by opening the hatch back or also independently therefrom is illustrated in FIG. 10. Therein the tension rod 14 that is supported by the slide 16 reaches approximately the first intermediary position illustrated in FIG. 7. During a further displacement of the slide 16 into its starting position illustrated in FIG. 7 the tension rod 14 follows the slide movement and thus moves into a second intermediary position which increases the access opening to the cargo space in size.

Figure 12:
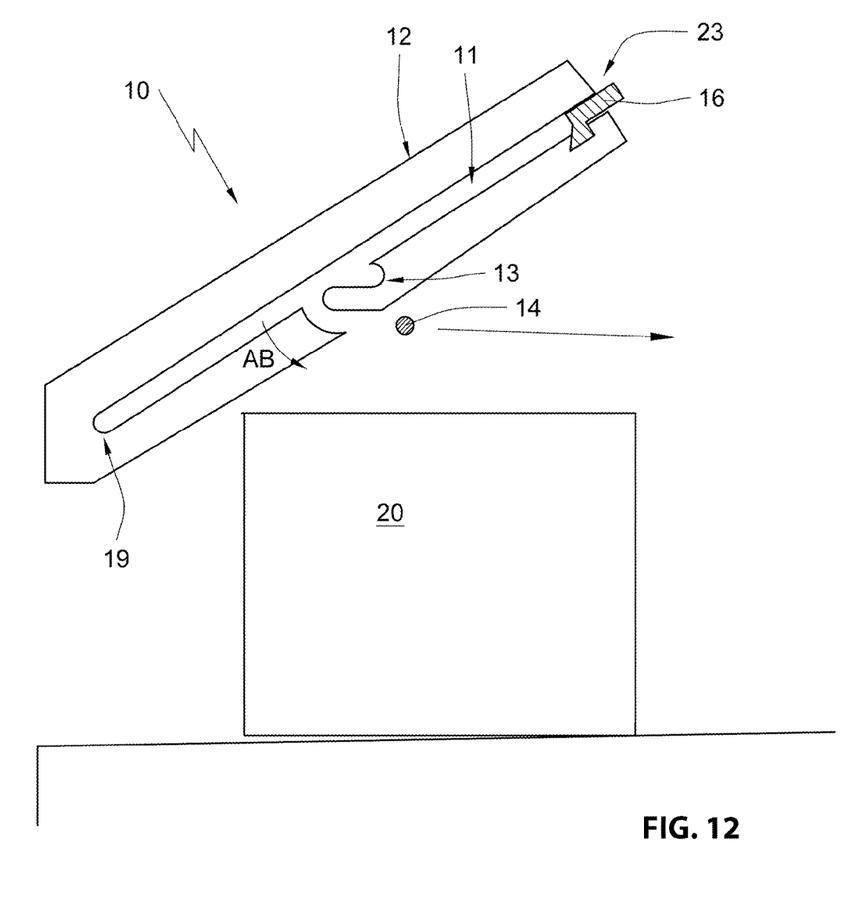
FIG. 12 illustrates extraction of the tension rod from the support profile in a particular loading situation.

FIG. 12 furthermore illustrates the advantages of the inlet 13 arranged proximal to the first intermediary position. FIG. 12 illustrates schematically that cargo 20 is now arranged in the cargo space. The cargo 20 has a certain height which does not permit a backward movement of the tension rod 14 into the pull out or cover position at the lower profile groove end 19. In this case the tension rod 14 can be moved in a direction towards the inlet 15 by hand and can be removed from the profile groove by a corresponding extraction movement AB.

It is certainly conceivable to arrange an additional inlet in the portion of the pull out or cover position of the tension rod 14. Furthermore it is evident from the drawing description that an intermediary position of the tension rod 14 most convenient for the user or most appropriate for a loading position can be implemented for optimum coverage or optimum access to the cargo space by a respective control of the separate positioning drive operating the slide 16. Thus, the instant invention provides a high level of flexibility to select advantageous intermediary positions by using the separate positioning drive.

Figure 13:
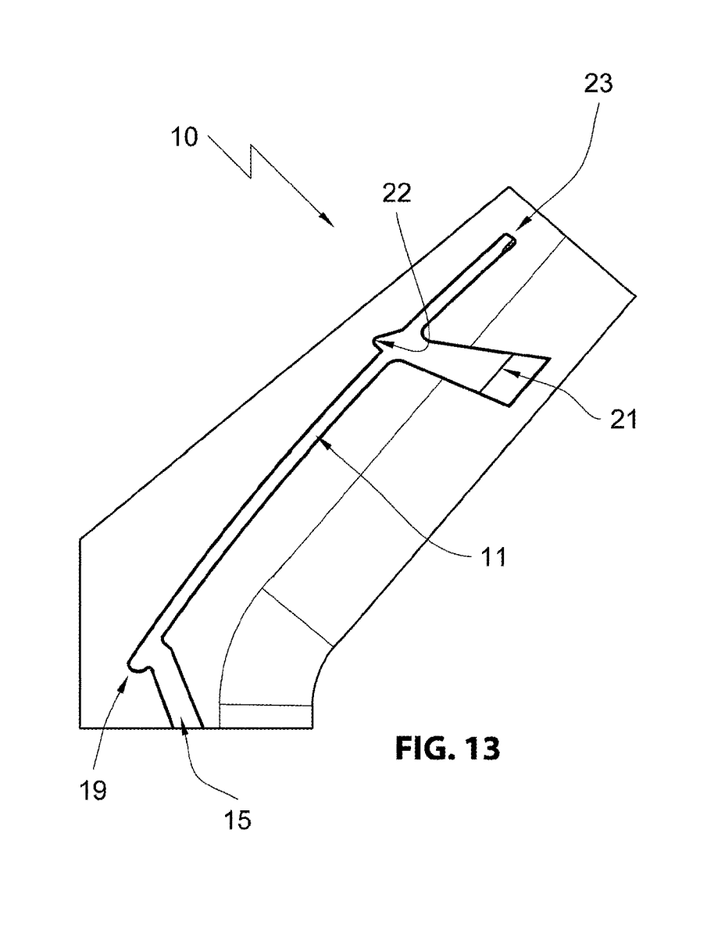
FIG. 13 illustrates the support profile in a third embodiment.

FIGS. 13-18 illustrate a third embodiment of the invention. FIG. 13 illustrates a side fairing 12 configured as a portion of a support device 10 and provided with a profile groove 11. The profile groove 11 forms a first seat 13 where the pull out or cover position that can be assumed by the tension rod 14 is reached. Arranged thereafter in pull in direction E a first inlet 15 is arranged. FIG. 13 illustrates a second inlet 21 where the profile groove 11 forms a stop 22. This stop 22 provides a tactile identifier for reaching the extraction position when manually operating the tension rod 14.

Figure 14:
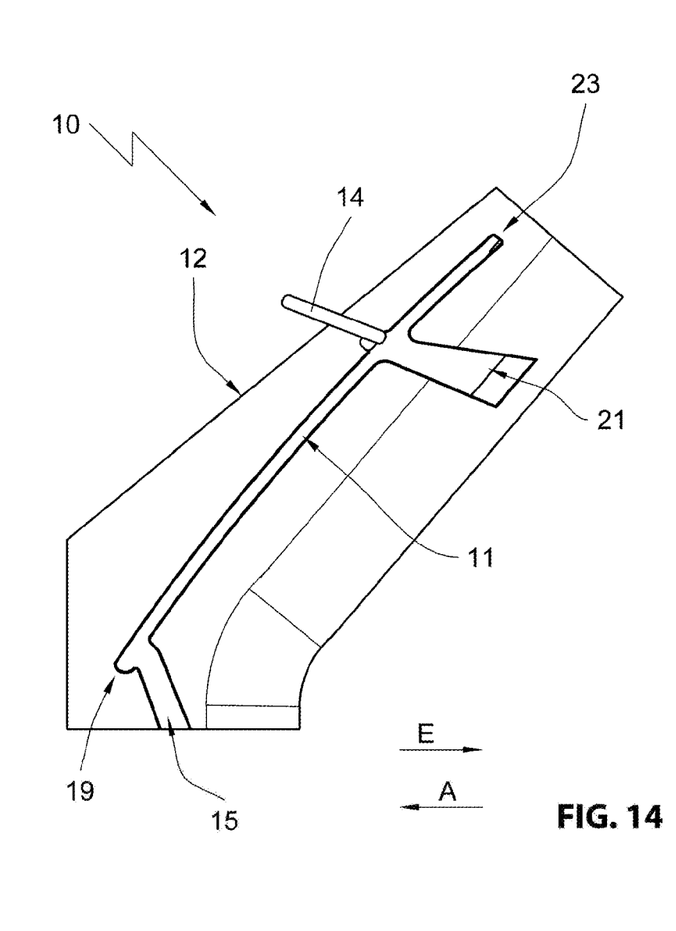
FIG. 14 illustrates the support profile according to FIG. 13 with the tension rod in an extraction position.
Figure 15:
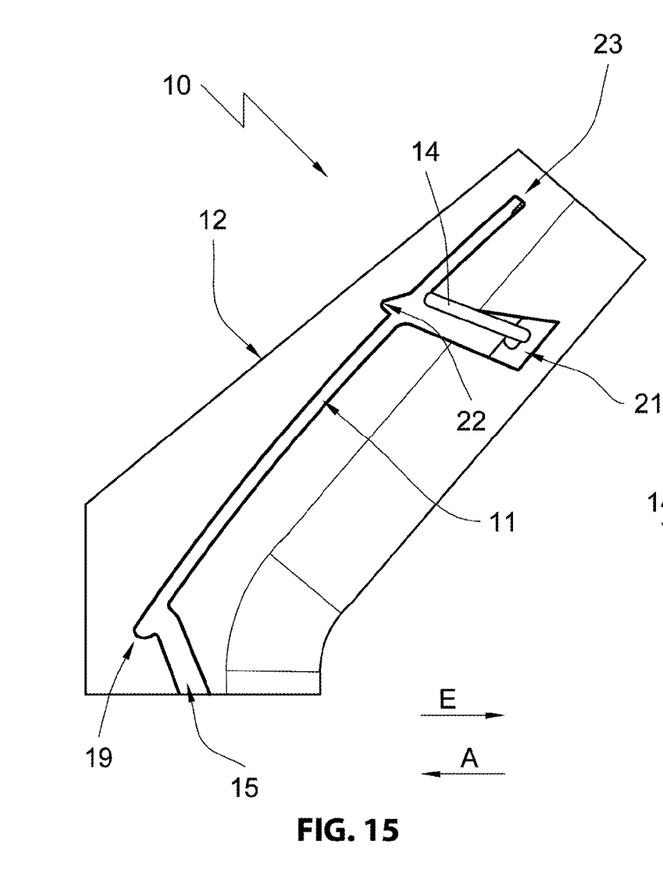
FIG. 15 illustrates the depiction according to FIG. 13 with the tension rod in the inlet.
Figure 16:
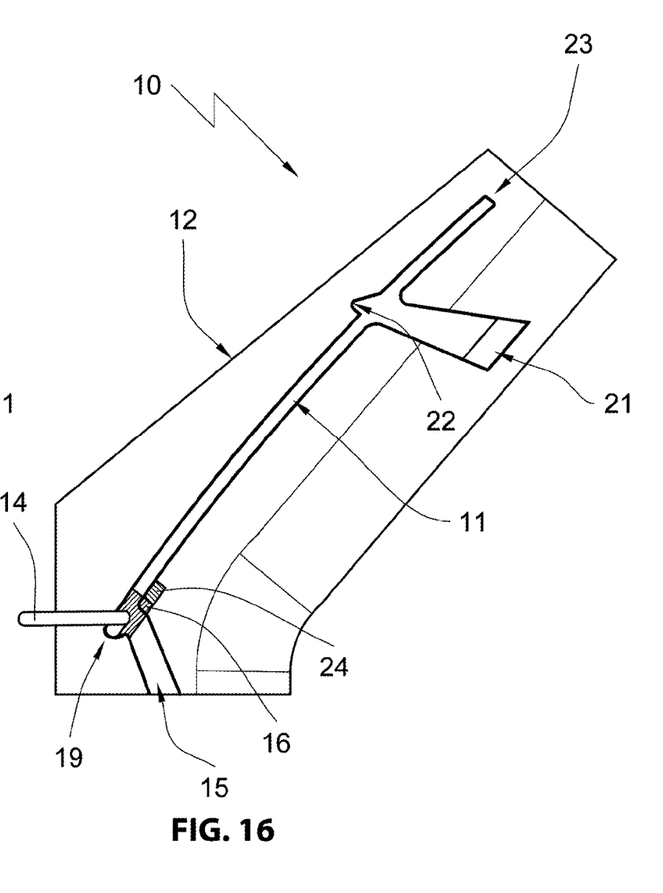
FIG. 16 illustrates the support profile according to FIG. 13 with the support rod retained in the cover position by a slide.

Manually extracting the tension rod 14 from the second inlet 21 is illustrated in FIGS. 14 and 15. In FIG. 14 the tension rod 14 has been moved from a lower end of the profile grove at 19 in a direction towards the upper end of the profile groove 20 until the tension rod penetrates the stop 22. Following the pull of the winding shaft motor 26 the winding shaft motor pulls the tension rod 14 out of the second inlet 21 and thus supports extracting the tension rod 14 from the profile groove 11.

The third embodiment, however illustrates an additional advantageous embodiment. Like in the remaining embodiments a slide 16 is supported in the profile groove wherein the slide 16 forms a lifting lug 17 and provides a receiver for the tension rod 14. Starting from a starting position at the upper profile groove end 23 the slide moves towards the lower profile groove end 19, wherein the slide keeps the tension rod 14 in the tension rod receiver. At the lower profile groove end 19 the tension or cover position of the roller blind is reached. Returning the roller blind into an intermediary position making the cargo space partially accessible is performed by moving the slide 16 in a direction towards the upper profile groove end 23.

Figure 17:
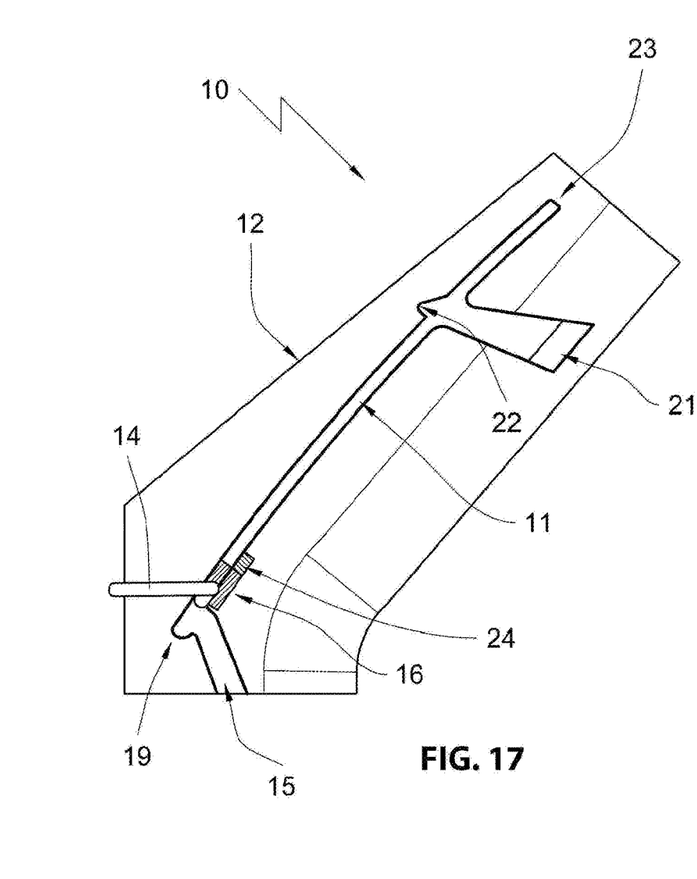
FIG. 17 illustrates the depiction according to FIG. 16 with the slide moved back.
Figure 18:
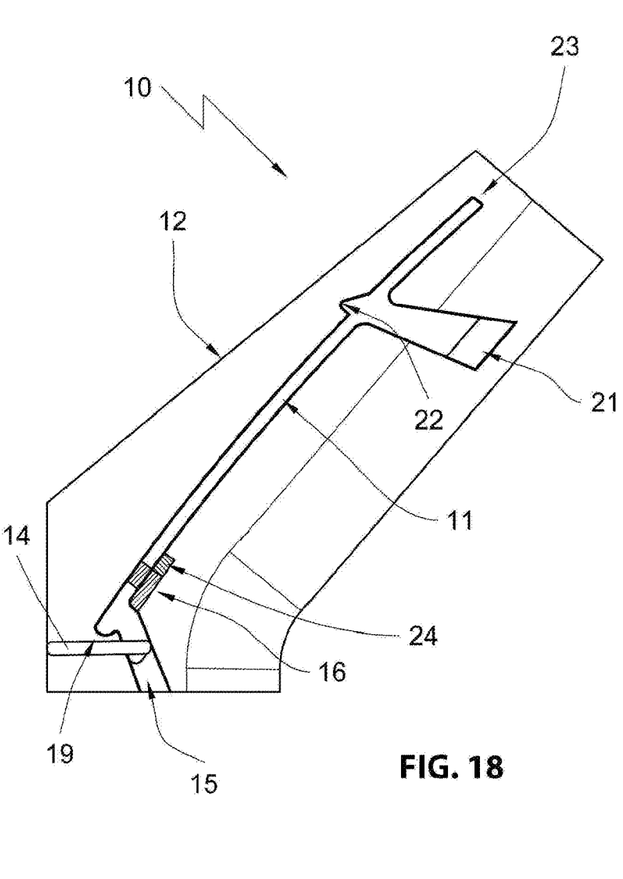
FIG. 18 illustrates the depiction according to FIG. 16 with the tension rod in the inlet.

The slide 16, however, is supported by a spring element 24 and is movable against the spring force of the spring element 24 about a defined distance in a direction towards an intermediary position or in a direction towards an upper profile groove end. When this is done as illustrated in FIG. 17 the tension rod 14 can be extracted through the first inlet 15 from the profile groove 11. The first inlet 15 is thus arranged subsequent to the lower profile groove end 19 in a direction towards the upper profile groove end 23. The extraction movement of the tension rod 14 through the first inlet 15 is illustrated in FIG. 18. This provides that the tension rod 14 can also be extracted from the profile groove 11 in case the positioning drive has failed.

REFERENCE NUMERALS AND DESIGNATIONS 10 support device
11 profile groove
12 side fairing
13 first seat
14 tension rod
15 inlet/first inlet
16 slide
17 lifting lug
18 lifting surface
19 lower profile groove end
20 cargo
21 second inlet
22 stop
23 upper profile groove end
24 spring element
25 positioning drive
26 winding shaft drive
27 roller blind
AB extraction movement
EB insertion movement
E pull in direction
A pull out direction

What is claimed is:

1. A cargo space cover for vehicles, comprising:
a roller blind which is fixated with a first edge of the roller blind at a winding shaft and which includes a tension rod at a second edge which is remote from the winding shaft;
a winding shaft drive which acts against a pull out movement of the roller blind and which moves the roller blind from a pulled out position into a pulled in position; and
a support device which cooperates with the tension rod and by which the roller bond is movable into an intermediary position that releases a vehicle cargo space at least partially,
wherein a positioning drive is provided in addition to the winding shaft drive, and
wherein the positioning drive moves the tension rod which moves the roller blind into at least one intermediary position,
wherein the support device is a support profile that is arranged at a vehicle body,
wherein at least one end of the tension rod engages the support profile,
wherein the support profile includes a lower profile groove end and an upper profile groove end,
wherein the support profile includes a first seat for the tension rod,
wherein the tension rod is retained in a cover position within the first seat and against the winding shaft drive, and
wherein the support profile includes a second seat for the tension rod and wherein the tension rod is supported in the second seat against the winding shaft drive in the intermediary position of the tension rod between the lower profile groove end and the upper profile groove end.

2. The cargo space cover according to claim 1,
wherein a slide is arranged in the support profile,
wherein the slide supports the tension rod against the winding shaft drive, and
wherein the positioning drive moves the slide which moves the roller blind into the intermediary position.

3. A cargo space cover for vehicles, comprising:
a roller blind which is fixated with a first edge of the roller blind at a winding shaft and which includes a tension rod at a second edge which is remote from the winding shaft;
a winding shaft drive which acts against a pull out movement of the roller blind and which moves the roller blind from a pulled out position into a pulled in position; and
a support device which cooperates with the tension rod and by which the roller blind is movable into an intermediary position that releases a vehicle cargo space at least partially,
wherein the support device is a support profile that is arranged at a vehicle body,
wherein at least one end of the tension rod engages the support profile,
wherein the support profile includes at least one inlet through which the at least one end of the tension rod is insertable into the support profile or removable from the support,
wherein the profile forms a stop,
wherein the stop is arranged opposite to the inlet
wherein the stop provides a tactile marking of the inlet,
wherein the tension rod is manually movable within the support profile.

* * * * *